(12) United States Patent
Zeng et al.

(10) Patent No.: US 8,552,638 B2
(45) Date of Patent: Oct. 8, 2013

(54) PIXEL ARRAY SUBSTRATE AND DISPLAY PANEL

(75) Inventors: Guang-Yi Zeng, Changhua County (TW); Yi-Cheng Tsai, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 139 days.

(21) Appl. No.: 13/217,304

(22) Filed: Aug. 25, 2011

(65) Prior Publication Data

US 2012/0306350 A1    Dec. 6, 2012

(30) Foreign Application Priority Data

Jun. 1, 2011  (TW) .............................. 100209945 U

(51) Int. Cl.
*H01L 51/50* (2006.01)
*H01L 51/52* (2006.01)

(52) U.S. Cl.
USPC ........... 313/505; 313/500; 439/149; 439/152; 315/169.3

(58) Field of Classification Search
USPC .................... 313/500–512; 349/149–152; 315/169.1–169.4
See application file for complete search history.

(56) References Cited

U.S. PATENT DOCUMENTS

| | | | | |
|---|---|---|---|---|
| 6,008,065 A | * | 12/1999 | Lee et al. | 257/59 |
| 6,025,891 A | * | 2/2000 | Kim | 349/40 |
| 6,038,003 A | * | 3/2000 | Kim | 349/152 |
| 7,760,313 B2 | | 7/2010 | Liu | |
| 2002/0158262 A1 | * | 10/2002 | Tsuchida | 313/505 |
| 2004/0183431 A1 | * | 9/2004 | Hirayama et al. | 313/500 |

* cited by examiner

*Primary Examiner* — Mariceli Santiago
(74) *Attorney, Agent, or Firm* — Jianq Chyun IP Office

(57) ABSTRACT

A pixel array substrate includes a substrate, a plurality of pixel structures, a plurality of signal lines, a plurality of first traces, a plurality of second traces, a plurality of first conductive structures, and a plurality of second conductive structures. The pixel structures are arranged in array in a display region of the substrate. The signal lines are disposed in the display region and are formed in a first conducting wire layer and are electrically connected to the pixel structures. The first traces and the second traces are disposed in a periphery circuit region of the substrate and are respectively formed in a second conducting wire layer and the first conducting wire layer. A part of the signal lines are electrically connected to the first traces by the first conductive structures. Another of the signal lines are electrically connected to the second traces by the second conductive structures.

15 Claims, 7 Drawing Sheets

PIXEL ARRAY SUBSTRATE AND DISPLAY PANEL

CROSS-REFERENCE TO RELATED APPLICATION

This application claims the priority benefit of Taiwan application serial no. 100209945, filed on Jun. 1, 2011. The entirety of the above-mentioned patent application is hereby incorporated by reference herein and made a part of this specification.

BACKGROUND OF THE INVENTION

1. Field of Invention

The invention relates to a pixel array substrate and a display panel, and more particularly to a pixel array substrate and a display panel having a dual trace.

2. Description of Related Art

With the vigorous development of display technologies, display panels have been applied in display devices of various dimensions, such as televisions, computer monitors, notebook computers, mobile phones, etc. Taking televisions for example, the consumer not only has demands in display properties such as resolution, contrast, and viewing angle, but the consumer is also increasingly making exterior aesthetics a deciding factor for purchase. Therefore, in order to satisfy consumer demands, manufacturers of display panels have devoted resources into developing slim border display panels, in which display panels having a same display quality achieve properties of lightness, thinness, slimness, and compactness.

In order to achieve display panels with slim borders, panel manufacturers need to reduce a distributed area of peripheral traces so as to reduce the width of the border. In conventional techniques, sophisticated lithography processes are employed to reduce the spacing between peripheral traces, thereby achieving the slim border display panel. However, as high-end televisions developed and the resolution of display panels has become more and more enhanced, the quantity of peripheral traces has also increased, which has caused difficulties in reducing the width of the display panel border.

Among the conventional techniques of reducing the border, a dual trace technique has been proposed. In this technique, since two neighboring peripheral traces belong to different layers, the distance between two peripheral traces can be shorter than two peripheral traces belonging to a same layer. Accordingly, the border width of the display panel is reduced. Nevertheless, in conventional dual trace techniques, the traces disposed in one of the layers need be jumped through conductive patterns to connect with the signal lines in the display region, whereas the traces in another layer belong to the same layer as the signal lines in the display region, and therefore these traces do not require conductive patterns to connect to the signal lines. Accordingly, the resistance values between the traces and the signal lines in one of the layers are clearly different from the resistance values between the traces and the signal lines in the other layer. Therefore, the display panels adopting this design would likely have an issue with bright and dark lines.

SUMMARY OF THE INVENTION

In view of foregoing, the invention provides a pixel array substrate for ameliorating the issue of bright and dark lines caused by large differences in resistance values in conventional techniques.

Moreover, the invention provides a display panel having the aforementioned pixel array substrate. The issue of bright and dark lines caused by large differences in resistance values in conventional techniques does not occur easily in the display panel.

The invention provides a pixel array substrate, including a substrate, a plurality of pixel structures, a plurality of signal lines, a plurality of first traces, a plurality of second traces, a plurality of first conductive structures, and a plurality of second conductive structures. The substrate includes a display region and a periphery circuit region substantially connected to the display region. The pixel structures are arranged in array in the display region. The signal lines are disposed in the display region and formed in a first conducting wire layer, and the signal lines are respectively electrically connected to the pixel structures. The first traces are disposed in the periphery circuit region and formed in a second conducting wire layer. The second traces are disposed in the periphery circuit region and formed in the first conducting wire layer. The second traces is insulated from the first traces. A part of the signal lines is respectively electrically connected to the first traces by the first conductive structures. Another part of the signal lines is respectively electrically connected to the second traces by the second conductive structures.

The invention provides a display panel, including the aforementioned pixel array substrate, an opposite substrate opposed to the pixel array substrate, and a display medium disposed between the pixel array substrate and the opposite substrate.

According to an embodiment of the invention, the pixel array substrate may further include a protective layer and an insulation layer. The protective layer is disposed on the substrate. The insulation layer is disposed between the first conducting wire layer and the second conducting wire layer, and the first conducting wire layer, the second conducting wire layer, and the insulation layer are disposed between the substrate and the protective layer.

According to an embodiment of the invention, the second conducting wire layer is disposed between the first conducting wire layer and the substrate.

According to an embodiment of the invention, the first conductive structures include a first opening, a second opening, and a first conductive pattern. The first opening penetrates the protective layer to expose the corresponding signal lines, and the second opening penetrates the protective layer and the insulation layer to expose the corresponding first traces. The first conductive pattern is disposed on the protective layer and is electrically connected to the corresponding signal lines through the first opening. Moreover, the first conductive pattern is electrically connected to the corresponding first traces through the second opening.

According to an embodiment of the invention, the second conductive structures include a third opening, a fourth opening, and a second conductive pattern. The third opening penetrates the protective layer to expose the corresponding signal lines, and the fourth opening penetrates the protective layer to expose the corresponding second traces. The second conductive pattern is disposed on the protective layer and is electrically connected to the corresponding signal lines through the third opening. Moreover, the second conductive pattern is electrically connected to the corresponding second traces through the fourth opening.

According to an embodiment of the invention, the first conducting wire layer is disposed between the second conducting wire layer and the substrate.

According to an embodiment of the invention, each of the first conductive structures includes a first opening, a second opening, and a first conductive pattern. The first opening penetrates the protective layer and the insulation layer to expose the corresponding signal lines, and the second opening penetrates the protective layer to expose the corresponding first traces. The first conductive pattern is disposed on the protective layer and is electrically connected to the corresponding signal lines through the first opening. Moreover, the first conductive pattern is electrically connected to the corresponding first traces through the second opening.

According to an embodiment of the invention, the second conductive structures include a third opening, a fourth opening, and a second conductive pattern. The third opening penetrates the protective layer and the insulation layer to expose the corresponding signal lines, and the fourth opening penetrates the protective layer and the insulation layer to expose the corresponding second traces. The second conductive pattern is disposed on the protective layer and is electrically connected to the corresponding signal lines through the third opening. Moreover, the second conductive pattern is electrically connected to the corresponding second traces through the fourth opening.

According to an embodiment of the invention, each of the signal lines has a first terminal pattern, each of the first traces has a second terminal pattern, and each of the second traces has a third terminal pattern.

According to an embodiment of the invention, a shape of the first terminal pattern of each of the signal lines, a shape of the second terminal pattern of each of the first traces, and a shape of the third terminal pattern of each of the second traces includes a rectangular, circular, or a polygonal shape.

According to an embodiment of the invention, each of the first conductive patterns covers the corresponding first terminal pattern and the corresponding second terminal pattern, and each of the second conductive patterns covers the corresponding first terminal pattern and the corresponding third terminal pattern.

According to an embodiment of the invention, a material of the first traces and the second traces is the same.

According to an embodiment of the invention, the signal lines, the first traces, and the second traces are not stacked on each other.

According to an embodiment of the invention, the first traces and the second traces are alternately arranged along a first direction, the first direction being perpendicular to an extended direction of the signal lines.

In the pixel array substrate and the display panel according to embodiments of the invention, the traces disposed in the periphery circuit region and belonging to different layers are connected to the signal lines in the display region by the conductive structures. Therefore, a resistance difference of each trace to the corresponding signal lines can be effectively lowered, thereby ameliorating the issue of bright and dark lines caused by differences in resistance values in conventional techniques.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

[First Embodiment]

Figure 1:
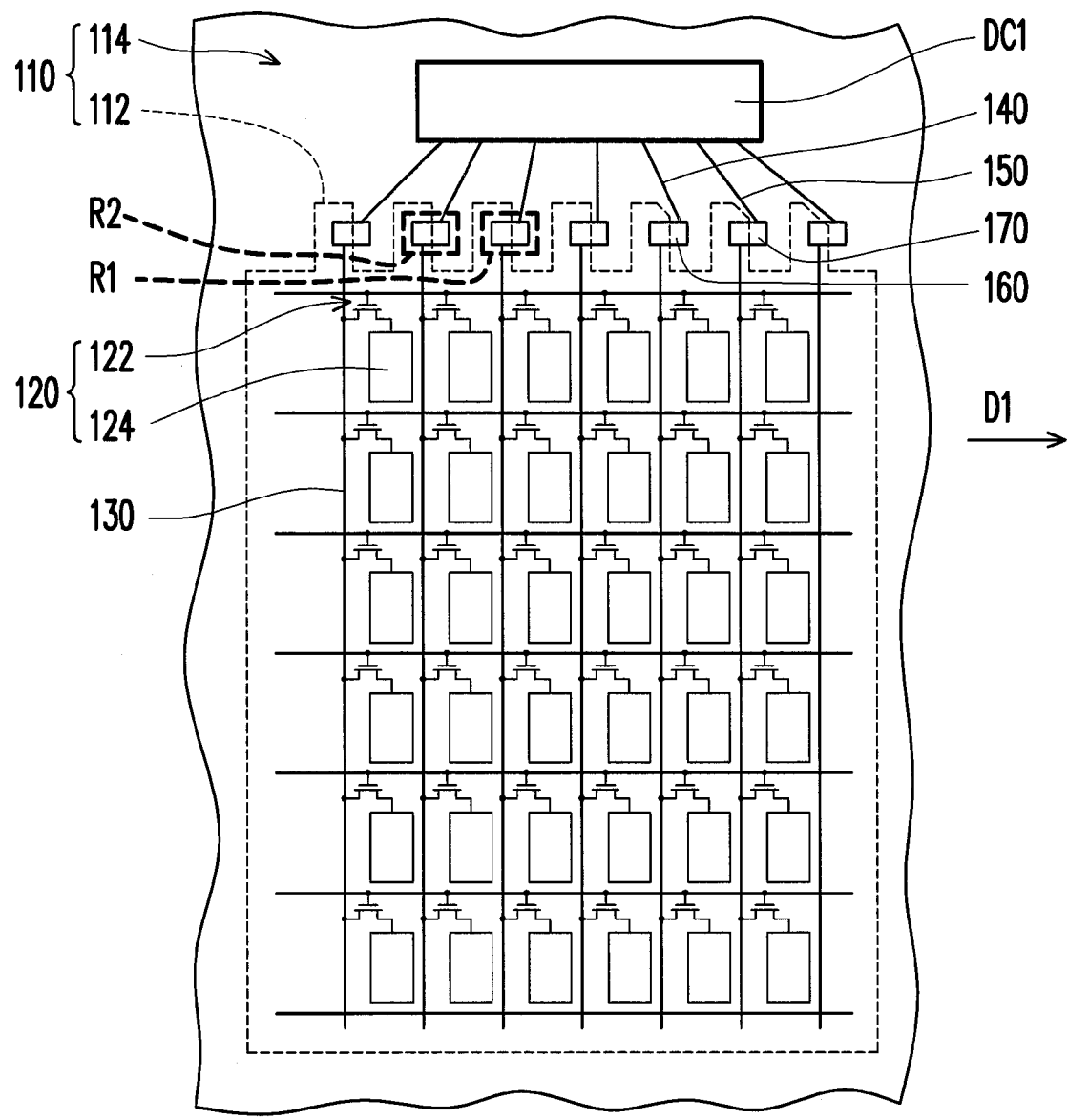
FIGS. 1 and 5 are schematic top views of a pixel array substrate according to an embodiment of the invention.

FIG. 1 is a schematic top view of a pixel array substrate according to an embodiment of the invention. Referring to FIG. 1, a pixel array substrate 100 of the present embodiment includes a substrate 110, a plurality of pixel structures 120, a plurality of signal lines 130, a plurality of first traces 140, a plurality of second traces 150, a plurality of first conductive structures 160, and a plurality of second conductive structures 170.

The substrate 110 of the present embodiment includes a display region 112 and a periphery circuit region 114. The periphery circuit region 114 is substantially connected to the display region 112. In the present embodiment, the substrate 110 is used for element carriage, and a material thereof may be glass, quartz, organic polymer, opaque/reflective material (e.g., a conductive material, a wafer, a ceramic material), or other suitable materials.

The pixel structures 120 of the present embodiment are arranged in array in the display region 112. More specifically, each of the pixel structures 120 of the present embodiment includes an active device 122 and a pixel electrode 124. In the present embodiment, the active device 122 may be a thin film transistor (TFT), for example an amorphous silicon (a-Si) TFT, a low temperature poly silicon (LIPS) TFT, a metal oxide TFT, and an organic TFT (OTFT), etc. A material of the pixel electrode 124 includes indium tin oxide (ITO), indium zinc oxide (IZO), aluminum tin oxide (ATO), aluminum zinc oxide (AZO), indium germanium zinc oxide (IGZO), other suitable oxides, or a stacked layer of at least two of the aforementioned materials.

The signal lines 130 of the present embodiment is disposed in the display region 112, and the signal lines 130 are respectively electrically connected to the pixel structures 120. In the present embodiment, the signal lines 130 may be data lines, and these data lines are electrically connected to a source of the active device 122. A material of the signal lines 130 of the present embodiment is a metal material, for example. However, the invention is not limited to the above descriptions. In some of the embodiments, other conductive materials may be adopted for the signal lines 130. For example, a metal alloy, a nitride of metallic materials, an oxide of metallic materials, a nitrogen oxide of metallic materials, or a stacked layer of metallic materials and other conductive materials may be adopted.

The first traces 140 and the second traces 150 of the present embodiment are disposed in the periphery circuit region 114, and the second traces 150 are insulated from the first traces 140. In the present embodiment, the first traces 140 and the second traces 150 are alternately arranged along a first direction D1, in which the first direction D1 is perpendicular to an extended direction of the signal lines 130. For example, the first traces 140 of the present embodiment include the odd-numbered traces counting from a left side of the periphery circuit region 114, and the second traces 150 of the present embodiment include the even-numbered traces counting from the left side of the periphery circuit region 114. In the present embodiment, the signal lines 130, the first traces 140, and the second traces 150 are not stacked on top of each other. In addition, a same material may be selectively adopted for the first traces 140 and the second traces 150 of the present embodiment. For example, a conductive material may be adopted for the first traces 140 and the second traces 150 of the present embodiment, such as a metal alloy, an nitride of metallic materials, an oxide of metallic materials, a nitrogen oxide of metallic materials, or a stacked layer of metallic materials and other conductive materials.

In the present embodiment, a part of the signal lines 130 (e.g., the odd-numbered signal lines 130 counting from a left side of the display region 112) is respectively electrically connected to the first traces 140 by the first conductive structures 160. Moreover, the other signal lines 130 (e.g., the even-numbered signal lines 130 counting from the left side of the display region 112) are respectively electrically connected to the second traces 150 by the second conductive structures 170.

Additionally, the pixel array substrate 100 may further include a drive circuit DC1 disposed in the periphery circuit region 114 and respectively electrically connected to the first traces 140 and the second traces 150. When the signal lines 130 are data lines, then the drive circuit DC1 is correspondingly a source driver that provides pixel voltages to the corresponding signal lines 130 by the first traces 140 and the second traces 150.

Figure 2A:
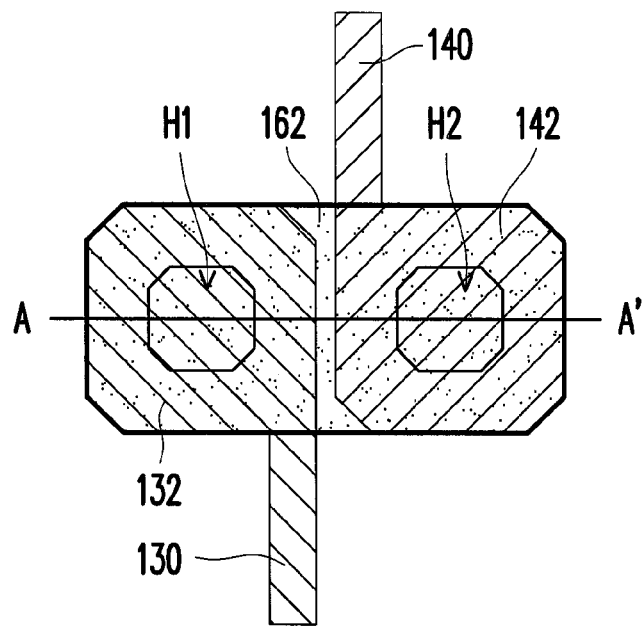
FIG. 2A is an enlarged view of a region R1 depicted in FIG. 1.
Figure 3A:
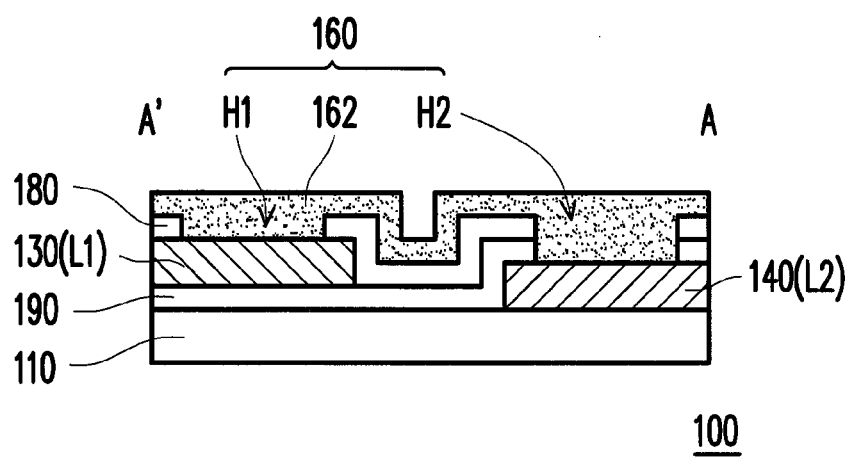
FIG. 3A is a schematic cross-sectional view of the pixel array substrate taken along a section line A-A' depicted in FIG. 2A.

FIG. 2A is an enlarged view of a region R1 depicted in FIG. 1. FIG. 3A is a schematic cross-sectional view of the pixel array substrate taken along a section line A-A' depicted in FIG. 2A. Referring concurrently to FIGS. 2A and 3A, in the present embodiment, the signal lines 130 are formed in a first conducting wire layer L1, and the first traces 140 are formed in a second conducting wire layer L2, as shown in FIG. 3A. In the present embodiment, the second layer L2 is disposed between the first conducting wire layer L1 and the substrate 110. In other words, the first conducting wire layer L1 is located above the second conducting wire layer L2. Moreover, the pixel array substrate of the present embodiment may further include a protective layer 180 and an insulation layer 190. The protective layer 180 is disposed on the substrate 110. The insulation layer 190 is disposed between the first conducting wire layer L1 and the second conducting wire layer L2, and the first conducting wire layer L1, the second conducting wire layer L2, and the insulation layer 190 are disposed between the substrate 110 and the protective layer 180.

Referring to FIGS. 2A and 3A, the first conductive structures 160 of the present embodiment include a first opening H1, a second opening H2, and a first conductive pattern 162. The first opening H1 penetrates the protective layer 180 to expose the corresponding signal lines 130. The second opening H2 penetrates the protective layer 180 and the insulation layer 190 to expose the first traces 140. In the present embodiment, the first conductive pattern 162 is disposed on the protective layer 180. The first conductive pattern 162 electrically connects to the corresponding signal lines 130 through the first opening H1, and the first conductive pattern 162 electrically connects to the corresponding first traces 140 through the second opening H2, so that the signal lines 130 are electrically connected to the first traces 140, as shown in FIG. 3A. In the present embodiment, the first conductive pattern 162 and the pixel electrode 124 belong to a same layer. A material of the first conductive pattern 162 includes ITO, IZO, ATO, AZO, IGZO, other suitable oxides, or a stacked layer of at least two of the aforementioned materials.

Moreover, the signal lines 130 of the present embodiment has a terminal pattern 132, and the first traces 140 has a terminal pattern 142, as shown in FIG. 2A. In the present embodiment, a shape of the terminal patterns 132 and 142 is polygonal, for example, although the invention is not limited thereto. In other embodiments of the invention, the shape of the terminal patterns 132 and 142 may be rectangular, circular, or have other suitable shapes. In the present embodiment, the first conductive pattern 162 covers the corresponding terminal patterns 132 and 142, as shown in FIG. 2A.

Figure 2B:
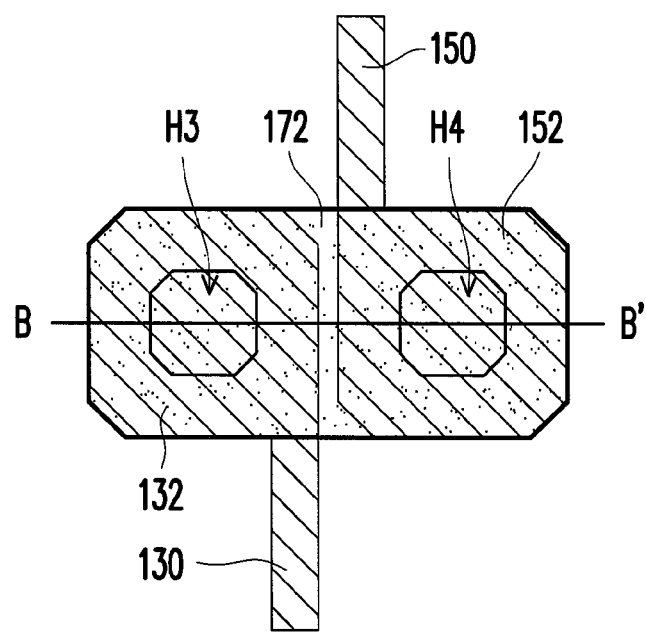
FIG. 2B is an enlarged view of a region R2 depicted in FIG. 1.
Figure 3B:
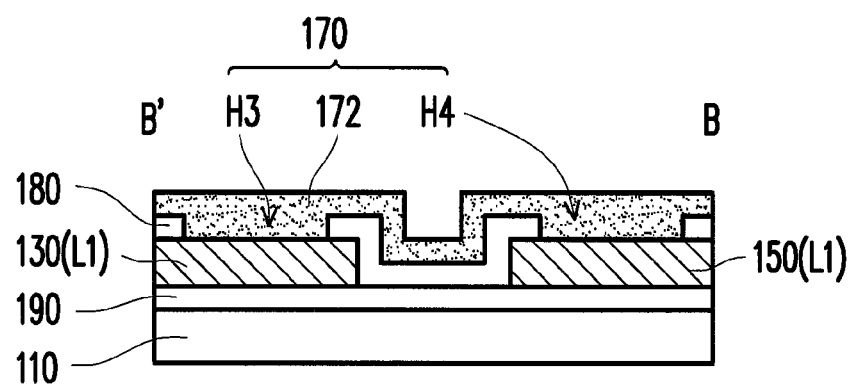
FIG. 3B is a schematic cross-sectional view of the pixel array substrate taken along a section line B-B' depicted in FIG. 2B.

FIG. 2B is an enlarged view of a region R2 depicted in FIG. 1. FIG. 3B is a schematic cross-sectional view of the pixel array substrate taken along a section line B-B' depicted in FIG. 2B. Referring concurrently to FIGS. 2B and 3B, the elements with the same reference symbols represent similar or the same layers described above. In the present embodiment, the signal lines 130 are formed in the first conducting wire layer L1, and the second traces 150 are also formed in the first conducting wire layer L1. The second conductive structures 170 of the present embodiment includes a third opening H3, a fourth opening H4, and a second conductive pattern 172. The third and fourth openings H3 and H4 penetrate the protective layer 180 to respectively expose the corresponding signal lines 130 and the second traces 150. The second conductive pattern 172 is disposed on the protective layer 180. The second conductive pattern 172 electrically connects to the corresponding signal lines 130 through the third opening H3, and the second conductive pattern 172 electrically connects to the corresponding second traces 150 through the fourth openings H4, so that the signal lines 130 are electrically connected to the second traces 150, as shown in FIG. 3B. In the present embodiment, the second conductive pattern 172 and the pixel electrode 124 belong to a same layer. A material of the second conductive pattern 172 includes ITO, IZO, ATO, AZO, IGZO, other suitable oxides, or a stacked layer of at least two of the aforementioned materials.

Moreover, the second traces 150 of the present embodiment has a terminal pattern 152, as shown in FIG. 2B. In the present embodiment, a shape of the terminal pattern 152 is polygonal, for example, although the invention is not limited thereto. In other embodiments of the invention, the shape of the terminal pattern 152 may be rectangular, circular, or have other suitable shapes. In the present embodiment, the second conductive pattern 172 covers the corresponding terminal patterns 132 and 152, as shown in FIG. 2B.

It should be noted that, in the present embodiment, each of the first traces 140 and each of the second traces 150 are respectively electrically connected to the corresponding signal lines 130 by the corresponding first conductive structures 160 or by the corresponding second conductive structures 170, and a same material may be adopted for the first traces 140 and the second traces 150. Therefore, a difference between a resistance value of the first traces 140 to the corresponding signal lines 130 and a resistance value of the second traces 150 to the corresponding signal lines 130 is extremely small. Accordingly, the issue of bright and dark lines caused by differences in resistance values in conventional techniques is ameliorated.

Figure 4:
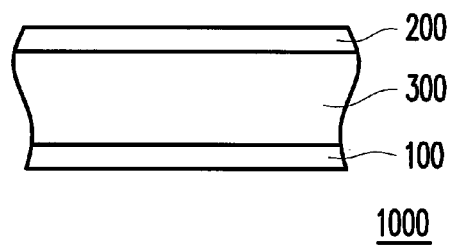
FIGS. 4 and 8 are schematic cross-sectional views of a display panel according to an embodiment of the invention.

FIG. 4 is a schematic cross-sectional view of a display panel according to an embodiment of the invention. Referring to FIG. 4, a display panel 1000 of the present embodiment includes the aforementioned pixel array substrate 100, an opposite substrate 200 opposed to the pixel array substrate 100, and a display medium 300 disposed between the pixel array substrate 100 and the opposite substrate 200. The issue of bright and dark lines caused by differences in resistance values in conventional techniques does not occur easily in the display panel 1000.

[Second Embodiment]

Figure 5:
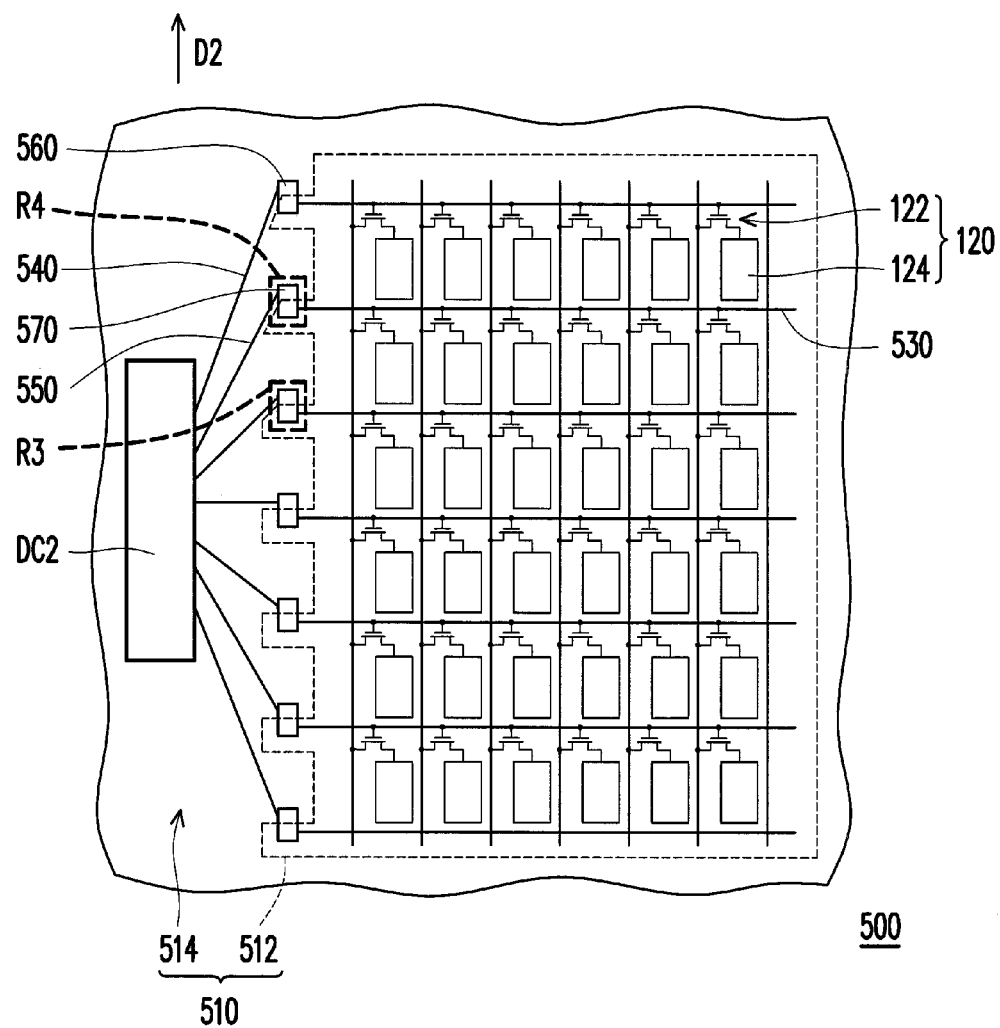

FIG. 5 is a schematic top view of a pixel array substrate according to an embodiment of the invention. With reference to FIG. 5, a pixel array substrate 500 of the present embodiment and the pixel array substrate 100 of the first embodiment are similar, and a difference therebetween mainly lies in that the signal lines 530 of the present embodiment are scan lines, and a drive circuit DC2 is correspondingly a gate driver. The pixel array substrate 500 of the present embodiment includes a substrate 510, a plurality of pixel structures 120, a plurality of signal lines 530, a plurality of first traces 540, a plurality of second traces 550, a plurality of first conductive structures 560, and a plurality of second conductive structures 570.

The substrate 510 of the present embodiment includes a display region 512 and a periphery circuit region 514. The periphery circuit region 514 is substantially connected to the display region 512. The pixel structures 120 of the present embodiment are arranged in array in the display region 512. More specifically, each of the pixel structures 120 of the present embodiment includes an active device 122 and a pixel electrode 124. The signal lines 530 of the present embodiment is disposed in the display region 512, and the signal lines 530 are respectively electrically connected to the pixel structures 120. In the present embodiment, the signal lines 530 may be scan lines, and these scan lines are electrically connected to a gate of the active device 122.

The first traces 540 and the second traces 550 of the present embodiment are disposed in the periphery circuit region 514, and the second traces 550 are insulated from the first traces 540. The first traces 540 and the second traces 550 are alternately arranged along a first direction D2, in which the second direction D2 is perpendicular to an extended direction of the signal lines 530. For example, the first traces 540 of the present embodiment include the odd-numbered traces counting from a top side of the periphery circuit region 514, and the second traces 550 of the present embodiment include the even-numbered traces counting from the top side of the periphery circuit region 514. A same material is adopted for the first traces 540 and the second traces 550 of the present embodiment.

In the present embodiment, a part of the signal lines 530 (e.g., the odd-numbered signal lines 530 counting from a top side of the display region 512) is respectively electrically connected to the first traces 540 by the first conductive structures 560. Moreover, the other signal lines 530 (e.g., the even-numbered signal lines 530 counting from the top side of the display region 512) are respectively electrically connected to the second traces 550 by the second conductive structures 570.

Figure 6A:
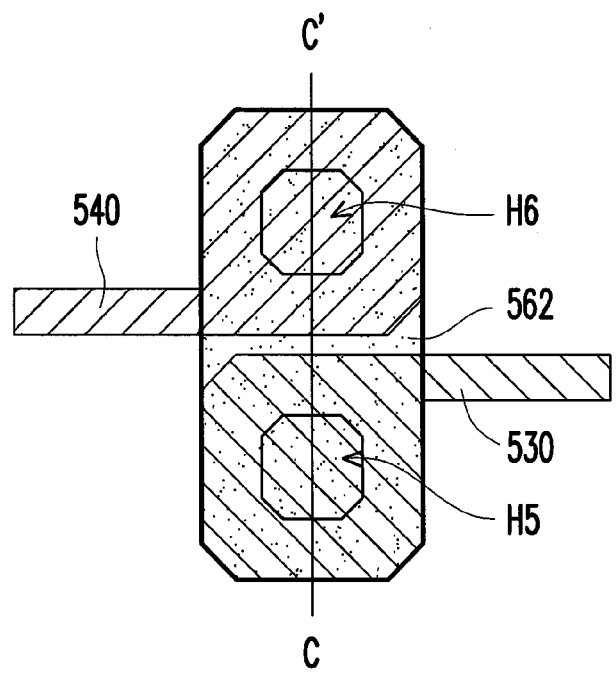
FIG. 6A is an enlarged view of a region R3 depicted in FIG. 5.
Figure 7A:
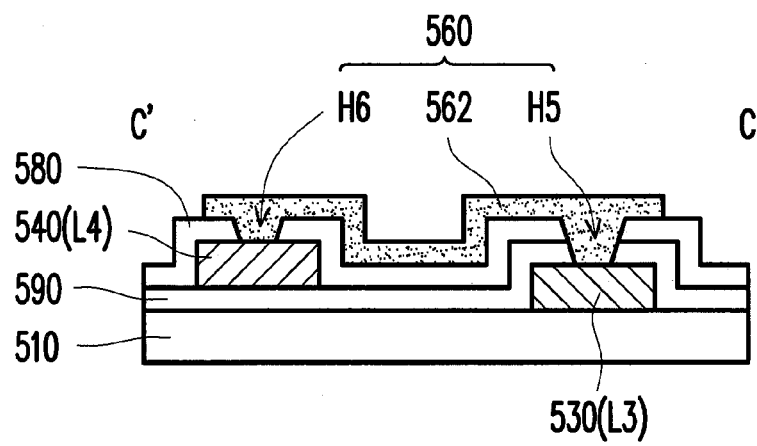
FIG. 7A is a schematic cross-sectional view of the pixel array substrate taken along a section line C-C' depicted in FIG. 6A.

FIG. 6A is an enlarged view of a region R3 depicted in FIG. 5. FIG. 7A is a schematic cross-sectional view of the pixel array substrate taken along a section line C-C' depicted in FIG. 6A. Referring concurrently to FIGS. 6A and 7A, in the present embodiment, the signal lines 530 are formed in a first conducting wire layer L3, and the first traces 540 are formed in a second conducting wire layer L4, as shown in FIG. 7A. In the present embodiment, the first conducting wire layer L3 is disposed between the second conducting wire layer L4 and the substrate 510. In other words, the second conducting wire layer L4 is located above the first conducting wire layer L3. Moreover, the pixel array substrate of the present embodiment may further include a protective layer 580 and an insulation layer 590. The protective layer 580 is disposed on the substrate 510. The insulation layer 590 is disposed between the first conducting wire layer L3 and the second conducting wire layer L4, and the first conducting wire layer L3, the second conducting wire layer L4, and the insulation layer 590 are disposed between the substrate 510 and the protective layer 580.

Referring to FIGS. 6A and 7A, the first conductive structures 560 of the present embodiment include a first opening H5, a second opening H6, and a first conductive pattern 562. The first opening H5 penetrates the protective layer 580 and the insulation layer 590 to expose the corresponding signal lines 530. The second opening H6 penetrates the protective layer 580 to expose the first traces 540. In the present embodiment, the first conductive pattern 562 is disposed on the protective layer 580. The first conductive pattern 562 electrically connects to the corresponding signal lines 530 through the first opening H5, and the first conductive pattern 562 electrically connects to the corresponding first traces 540 through the second opening H6, so that the signal lines 530 are electrically connected to the first traces 540, as shown in FIG. 7A.

Figure 6B:
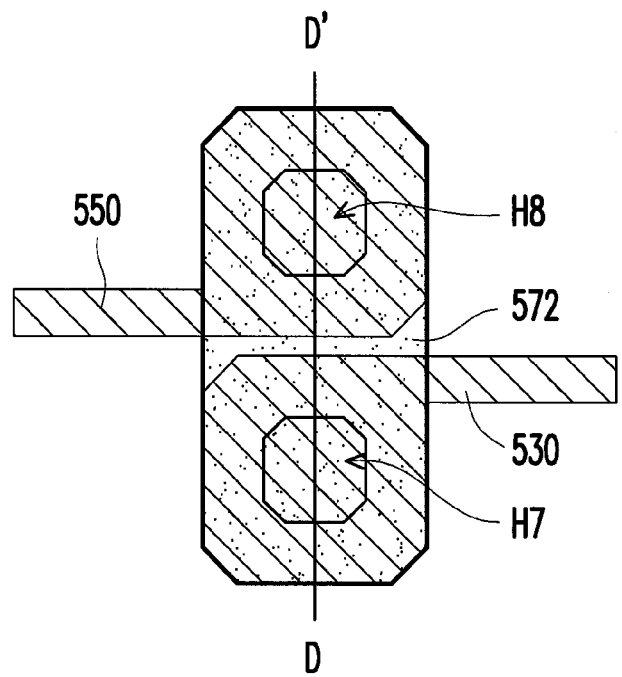
FIG. 6B is an enlarged view of a region R4 depicted in FIG. 5.
Figure 7B:
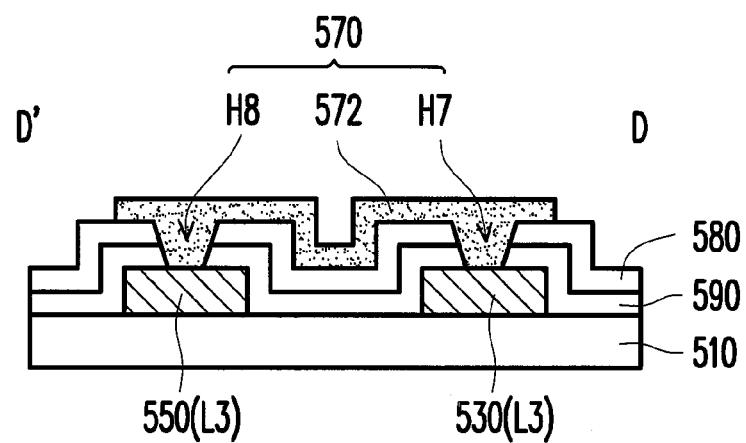
FIG. 7B is a schematic cross-sectional view of the pixel array substrate taken along a section line D-D' depicted in FIG. 6B.

FIG. 6B is an enlarged view of a region R4 depicted in FIG. 5. FIG. 7B is a schematic cross-sectional view of the pixel array substrate taken along a section line D-D' depicted in FIG. 6B. Referring concurrently to FIGS. 6B and 7B, in the present embodiment, the signal lines 530 are formed in the first conducting wire layer L3, and the second traces 550 are also formed in the first conducting wire layer L3. The second conductive structures 570 of the present embodiment include a third opening H7, a fourth opening H8, and a second conductive pattern 572. The third and fourth openings H7 and H8 penetrate the protective layer 580 and the insulation layer 590 to respectively expose the corresponding signal lines 530 and the second traces 550. The second conductive pattern 572 is disposed on the protective layer 580. The second conductive pattern 572 electrically connects to the corresponding signal lines 530 through the third opening H7, and the second conductive pattern 572 electrically connects to the corresponding second traces 550 through the fourth opening H8, so that the signal lines 530 are electrically connected to the second traces 550, as shown in FIG. 7B.

It should be noted that, in the present embodiment, each of the first traces 530 and each of the second traces 540 are respectively electrically connected to the corresponding signal lines 530 by the corresponding first conductive structures 560 or by the corresponding second conductive structures 570. Moreover, a same material may be adopted for the first traces 530 and the second traces 540. Therefore, a difference between a resistance value of the first traces 540 to the corresponding signal lines 530 and a resistance value of the second traces 550 to the corresponding signal lines 530 is extremely small. Accordingly, the issue of bright and dark lines caused by differences in resistance values in conventional techniques is ameliorated.

Figure 8:
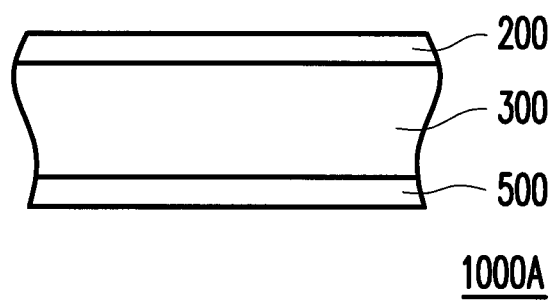

FIG. 8 is a schematic cross-sectional view of a display panel according to an embodiment of the invention. Referring to FIG. 8, a display panel 1000A of the present embodiment includes the aforementioned pixel array substrate 500, the opposite substrate 200 opposed to the pixel array substrate 500, and the display medium 300 disposed between the pixel array substrate 500 and the opposite substrate 200. The issue of bright and dark lines caused by differences in resistance values in conventional techniques does not occur easily in the display panel 1000A.

In view of the foregoing, in the pixel array substrate and the display panel according to embodiments of the invention, the traces disposed in the periphery circuit region and belonging to different layers are connected to the signal lines in the display region by the conductive structures. Therefore, a resistance difference of each trace to the corresponding signal lines can be effectively lowered, thereby ameliorating the issue of bright and dark lines caused by differences in resistance values in conventional techniques.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A pixel array substrate, comprising:
a substrate comprising a display region and a periphery circuit region substantially connected to the display region;
a plurality of pixel structures arranged in array in the display region;
a plurality of signal lines disposed in the display region and formed in a first conducting wire layer, and respectively electrically connected to the pixel structures;
a plurality of first traces disposed in the periphery circuit region and formed in a second conducting wire layer;
a plurality of second traces disposed in the periphery circuit region and formed in the first conducting wire layer, the second traces being insulated from the first traces;
a plurality of first conductive structures, a part of the signal lines respectively electrically connecting to the first traces by the first conductive structures; and
a plurality of second conductive structures, another part of the signal lines respectively electrically connecting to the second traces by the second conductive structures.

2. The pixel array substrate as claimed in claim 1, further comprising:
a protective layer disposed on the substrate; and
an insulation layer disposed between the first conducting wire layer and the second conducting wire layer, and the first conducting wire layer, the second conducting wire layer, and the insulation layer are disposed between the substrate and the protective layer.

3. The pixel array substrate as claimed in claim 2, wherein the second conducting wire layer is disposed between the first conducting wire layer and the substrate.

4. The pixel array substrate as claimed in claim 3, wherein each of the first conductive structures comprises:
a first opening penetrating the protective layer to expose the corresponding signal lines;
a second opening penetrating the protective layer and the insulation layer to expose the corresponding first traces; and
a first conductive pattern disposed on the protective layer, the first conductive pattern electrically connected to the corresponding signal lines through the first opening, and electrically connected to the corresponding first traces through the second opening.

5. The pixel array substrate as claimed in claim 3, wherein each of the second conductive structures comprises:
a third opening penetrating the protective layer to expose the corresponding signal lines;
a fourth opening penetrating the protective layer to expose the corresponding second traces; and
a second conductive pattern disposed on the protective layer and electrically connected to the corresponding signal lines through the third opening, and electrically connected to the corresponding second traces through the fourth opening.

6. The pixel array substrate as claimed in claim 2, wherein the first conducting wire layer is disposed between the second conducting wire layer and the substrate.

7. The pixel array substrate as claimed in claim 6, wherein each of the first conductive structures comprises:
a first opening penetrating the protective layer and the insulation layer to expose the corresponding signal lines;
a second opening penetrating the protective layer to expose the corresponding first traces; and
a first conductive pattern disposed on the protective layer and electrically connected to the corresponding signal lines through the first opening, and electrically connected to the corresponding first traces through the second opening.

8. The pixel array substrate as claimed in claim 6, wherein each of the second conductive structures comprises:
a third opening penetrating the protective layer and the insulation layer to expose the corresponding signal lines;
a fourth opening penetrating the protective layer and the insulation layer to expose the corresponding second traces; and
a second conductive pattern disposed on the protective layer and electrically connected to the corresponding signal lines through the third opening, and electrically connected to the corresponding second traces through the fourth opening.

9. The pixel array structure as claimed in claim 1, wherein each of the signal lines has a first terminal pattern, each of the first traces has a second terminal pattern, and each of the second traces has a third terminal pattern.

10. The pixel array structure as claimed in claim 9, wherein a shape of the first terminal pattern of each of the signal lines, a shape of the second terminal pattern of each of the first traces, and a shape of the third terminal pattern of each of the second traces comprises a rectangular, a circular, or a polygonal shape.

11. The pixel array structure as claimed in claim 10, wherein each of the first conductive patterns covers the corresponding first terminal pattern and the corresponding second terminal pattern, and each of the second conductive patterns covers the corresponding first terminal pattern and the corresponding third terminal pattern.

12. The pixel array substrate as claimed in claim 1, wherein the first traces and the second traces comprise a same material.

13. The pixel array substrate as claimed in claim 1, wherein the signal lines, the first traces, and the second traces are not stacked on each other.

14. The pixel array substrate as claimed in claim 1, wherein the first traces and the second traces are alternately arranged along a first direction, the first direction being perpendicular to an extended direction of the signal lines.

15. A display panel comprising:

a pixel array substrate, comprising:
- a substrate comprising a display region and a periphery circuit region substantially connected to the display region;
- a plurality of pixel structures arranged in array in the display region;
- a plurality of signal lines disposed in the display region and formed in a first conducting wire layer, and respectively electrically connected to the pixel structures;
- a plurality of first traces disposed in the periphery circuit region and formed in a second conducting wire layer;
- a plurality of second traces disposed in the periphery circuit region and formed in the first conducting wire layer, the second traces being insulated from the first traces;
- a plurality of first conductive structures, a part of the signal lines respectively electrically connecting to the first traces by the first conductive structures; and
- a plurality of second conductive structures, another part of the signal lines respectively electrically connecting to the second traces by the second conductive structures;

an opposite substrate opposed to the pixel array substrate; and a display medium disposed between the pixel array substrate and the opposite substrate.

* * * * *